Patented June 11, 1935

2,004,132

UNITED STATES PATENT OFFICE 2,004,132

PHENYL CARBAMATES OF AMINOPRO-PANEDIOLS

Theodore H. Rider, Cincinnati, Ohio

No Drawing. Application August 10, 1931,
Serial No. 556,331

11 Claims.  (Cl. 260—43)

The present invention relates to the production of the salts of gamma-dialkyl amino propanediol esters of aromatic carbamic acids which possess the general formula

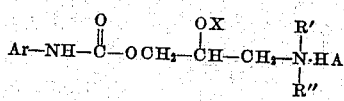

in which R' and R'' represent alkyl radicals which may be either alike or different or in which the grouping

may represent a heterocyclic ring attached through nitrogen (such as the piperidine ring); in which Ar represents an aromatic group such as a phenyl group or a substituted phenyl group, in which .HA represents any highly ionized mineral acid, and in which X represents hydrogen or an acyl radical.

*General method of synthesizing compounds of this series*

Phenyl isocyanate (or other aromatic or substituted aromatic isocyanate or one of the corresponding carbamyl chlorides) is added to an equal molecular quantity of a dialkylamino propanediol in ether as a solvent. The mixture is heated for a short time to insure completion of the reaction. The formation of the ester linkage is completed at this point and the resultant compound has a probable formula as follows:

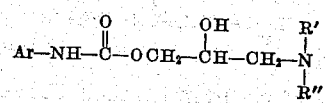

It is possible to isolate the ester at this point, but it is preferable to prepare a salt by adding an acid to the ether solution. In such manner the hydrochloride of the ester is precipitated by passing dry gaseous hydrogen chloride into the reaction mixture. The precipitated hydrochloride (frequently an oil) is separated by decantation and recrystallized from a mixture of ethyl acetate and acetone. The salt precipitated at this point has a probable formula as follows:

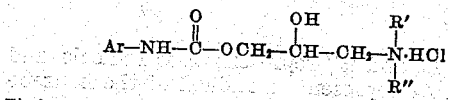

It is especially to be noted that the ester containing the free hydroxyl group prepared as just described (the mono-ester in which the X in the first formula represents hydrogen) is easily destroyed by alkali, so that it is not feasible to isolate it according to the procedure usual in other cases, of dissolving the hydrochloride in water and throwing out the free base by adding alkali.

The mono-ester may be further reacted with other acid chlorides or isocyanates to give simple or mixed esters. Where a simple di-ester (i. e. where X represents a carbamyl radical, both ester groupings being identical) is desired, it is simpler to react the dialkylamino propanediol with two molecular quantities of phenyl isocyanate (or other isocyanate or acid chloride). This reaction is carried out in a manner similar to that described above for the preparation of the mono-ester. The probable formula for such a di-ester is as follows:

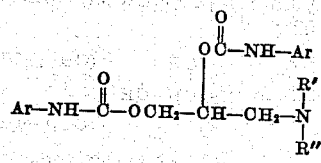

This ester may be isolated as such or its salts may be formed directly as described above for the mono-ester. In the case of the di-ester, it is more feasible to isolate the free base by adding alkali to an aqueous solution of the hydrochloride. Both types of esters possess anesthetic properties.

*Specific compounds in the mono-ester series*

A specific compound belonging to the general series of mono-esters as above defined is the hydrochloride of the mono phenyl urethane of gamma-di-n-butyl amino propanediol, the probable formula of which is as follows:

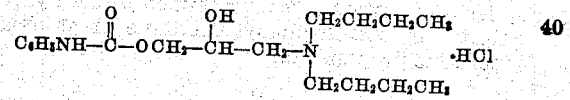

It may be prepared by the general process described above. In 100 cc. of anhydrous ether, 5.8 g. of phenyl isocyanate are added to 10 g. of di-n-butyl amino propanediol and the solution boiled for about one hour, after which it is cooled and saturated with dry hydrogen chloride gas. The ether layer is then decanted off and the remaining oily product is dissolved in a hot mixture of acetone and ethyl acetate which on cooling precipitates white crystals of the hydrochloride of the mono phenyl urethane of gamma-di-n-butyl amino propanediol, melting at 128–129° C.

The product is a local anesthetic. Following the specific directions just mentioned, the following additional compounds have been prepared, the probable formulas of which are indicated.

The hydrochloride of the mono phenyl urethane of di-methyl amino propanediol, white crystals, M. P. 138–140°;

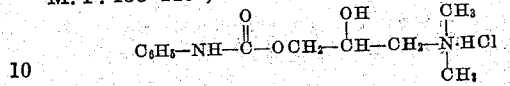

the hydrochloride of the mono phenyl urethane of di-ethyl amino propanediol, white crystals, M. P. 135°;

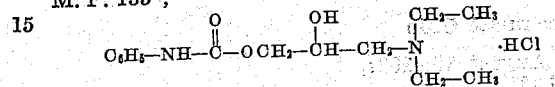

the hydrochloride of the mono phenyl urethane of di-n-propylamino propanediol, white crystals, M. P. 163–164°;

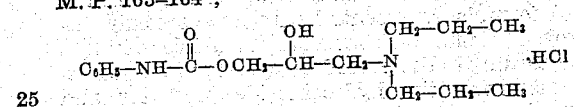

the hydrochloride of the mono phenyl urethane of di-isobutyl amino propanediol, white crystals, M. P. 125–127°;

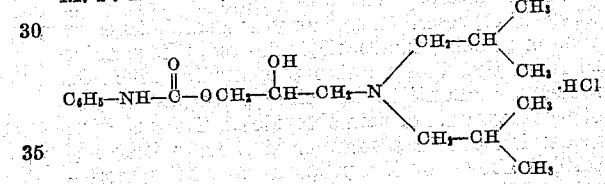

the hydrochloride of the mono phenyl urethane of di-n-amylamino propanediol, white crystals, M. P. 101–103°;

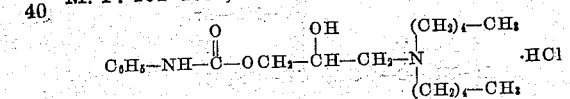

and the hydrochloride of the mono-phenyl urethane of piperidino propanediol, white crystals, M. P. 176–177°

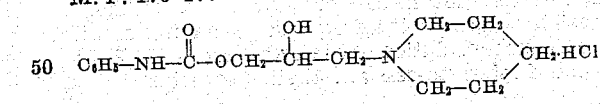

These compounds may also be obtained as salts of nitric, sulfuric and other acids, both inorganic and organic.

Specific compounds in the di-ester series

A specific compound belonging to the general series of di-esters as above defined is the hydrochloride of the di-phenyl urethane of gamma-piperidino propanediol

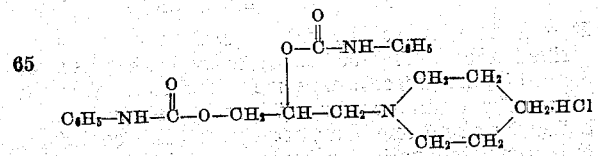

It may be prepared by the general process described above. In 100 cc. of anhydrous ether 15.0 g. of phenyl isocyanate are added to 10 g. of piperidino propanediol and the solution boiled for two hours, after which it is cooled and saturated with dry hydrogen chloride gas. The ether layer is then decanted off and the remaining insoluble product is dissolved in a hot mixture of acetone and ethyl acetate which on cooling precipitates white crystals of the hydrochloride of the di-phenylurethane of gamma-piperidino propanediol, melting at 197–198° C. Following the specific directions just mentioned the following additional compounds have been prepared, the probable formulas of which are indicated. The hydrochloride of the diphenyl urethane of di-ethyl amino propanediol, white crystals, M. P. 109°;

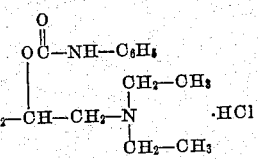

the hydrochloride of the di-phenyl urethane of di-n-propyl amino propanediol, white crystals, M. P. 183–188°;

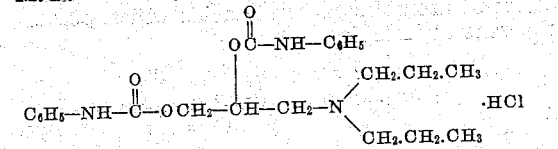

the hydrochloride of the diphenyl urethane of di-isobutylamino propanediol, white crystals, M. P. 116–118°;

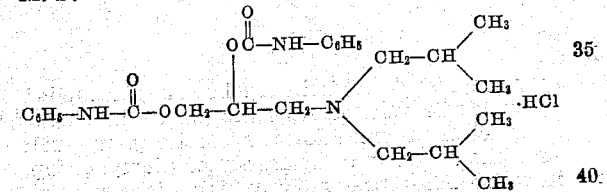

These compounds have anesthetic properties and may be obtained as the salts of other inorganic acids and of organic acids.

An aqueous solution of the hydrochloride of the diphenyl urethane of diethylamino propanediol treated with alkali precipitates the free base which may be filtered off and recrystallized from high boiling petroleum ether yielding white crystals melting at 106.5° C. The probable formula of this free base is

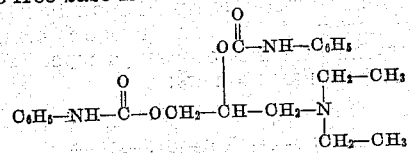

The scope of the invention should be determined by the language of the appended claims, which should be interpreted as broadly as possible consistent with the state of the art.

What is claimed is:

1. The hydrochloride of a gamma dialkylamino propanediol ester of an aromatic carbamic acid possessing the general structure

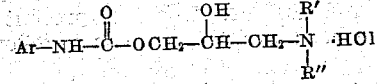

in which R' and R'' represent alkyl radicals, and in which Ar represents a radical of the benzene series.

2. The hydrochloride of a gamma dialkylamino propanediol ester of an aromatic carbamic acid possessing the general structure

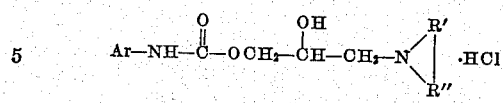

in which R' and R'' represent a pentamethylene chain both ends of which are attached to the N atom, and in which Ar represents a radical of the benzene series.

3. The hydrochloride of a gamma dialkylamino propanediol ester of an aromatic carbamic acid possessing the general structure

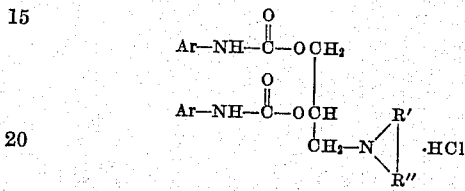

in which R' and R'' represent a pentamethylene chain both ends of which are attached to the N atom, and in which Ar represents a radical of the benzene series.

4. The hydrochloride of the mono phenyl urethane of gamma-di-n-butylamino propanediol which is a white crystalline solid melting at 128–9° C. and which possesses anesthetic properties.

5. The hydrochloride of the di phenylurethane of gamma-piperidino propanediol which is a white crystalline solid melting at 197–198° C., and which possesses anesthetic properties.

6. A compound of the general series

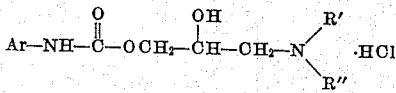

in which R' and R'' represent alkyl radicals or in which R' and R'' together may represent a pentamethylene chain both ends of which are attached to the N atom, in which Ar represents a radical of the benzene series, and in which the hydrogen of the hydroxyl group may be esterified with an aryl carbamic acid of the benzene series, the balance of the compound being unchanged.

7. The hydrochloride of a gamma di-alkylamino propanediol ester of an aromatic carbamic acid possessing the general structure

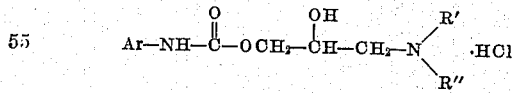

in which R' and R'' represent alkyl radicals or in which R' and R'' together represent a pentamethylene chain both ends of which are attached to the N atom, in which Ar represents a radical of the benzene series, and in which the hydrogen of the hydroxyl group may be esterified with an aryl carbamic acid of the benzene series, the balance of the compound being unchanged.

8. The hydrochloride of a gamma-dialkyl amino propanediol ester of an aromatic carbamic acid possessing the general structure:

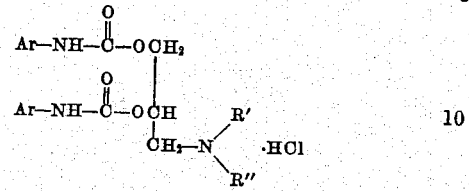

in which R' and R'' represent alkyl radicals or in which R' and R'' together represent a pentamethylene chain both ends of which are attached to the N atom, and in which Ar represents a radical of the benzene series.

9. A compound of the general series

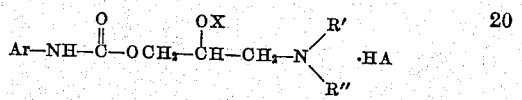

in which R' and R'' represent alkyl radicals or in which R' and R'' together represent a pentamethylene chain both ends of which are attached to the N atom, in which Ar represents a radical of the benzene series, in which X represents hydrogen or an aryl carbamyl radical of the benzene series and in which HA represents a highly ionized mineral acid.

10. A compound of the general series

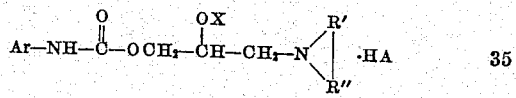

in which R' and R'' represent a pentamethylene chain both ends of which are attached to the N atom, in which Ar represents a radical of the benzene series, in which X represents hydrogen or an aryl carbamyl radical of the benzene series and in which HA represents a highly ionized mineral acid.

11. A monophenyl urethane of a gamma aminopropanediol possessing the general structure

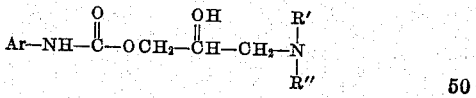

in which R' and R'' represent alkyl radicals or in which R' and R'' together will be a pentamethylene chain both ends of which are attached to the N atom, in which Ar represents a radical of the benzene series, this compound existing in an organic solvent in substantially pure state when prepared as described and being in this state capable of having its free hydroxyl group acted upon by compounds of an acidic nature in order to prepare di-esters.

THEODORE H. RIDER.